US009654296B2

(12) United States Patent
Andiappan et al.

(10) Patent No.: US 9,654,296 B2
(45) Date of Patent: May 16, 2017

(54) HANDLING SENSOR DATA

(71) Applicant: Intel Corporation, Santa Clara, CA (US)

(72) Inventors: Rajasekaran Andiappan, Tampere, FL (US); Uttam K. Sengupta, Portland, OR (US); Eli Elik Kupermann, Maale Adumim (IL); Mandar Joshi, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 14/467,252

(22) Filed: Aug. 25, 2014

(65) Prior Publication Data

US 2016/0056964 A1 Feb. 25, 2016

(51) Int. Cl.
*G06F 11/30* (2006.01)
*G06F 12/14* (2006.01)
*H04L 9/32* (2006.01)
*G06F 21/60* (2013.01)
*G06F 21/62* (2013.01)
(Continued)

(52) U.S. Cl.
CPC .......... *H04L 9/3263* (2013.01); *G06F 21/602* (2013.01); *G06F 21/6245* (2013.01); *G09C 1/00* (2013.01); *G06F 21/72* (2013.01); *H04L 2209/12* (2013.01); *H04L 2209/805* (2013.01)

(58) Field of Classification Search
CPC .......... G06F 21/60; G06F 21/62; G06F 21/72; G06F 21/602; G06F 21/6245; H04L 2209/12
See application file for complete search history.

(56) References Cited

U.S. PATENT DOCUMENTS 8,892,403 B1* 11/2014 Le Grand ................ G01D 9/00
702/187
2005/0012592 A1* 1/2005 Debelleix .......... G07C 9/00158
340/5.52
(Continued)

FOREIGN PATENT DOCUMENTS

WO 2014089749 6/2014

OTHER PUBLICATIONS

Search Report and Written Opinion for PCT/US2015/037614 mailed on Oct. 7, 2015, 14 pages.
(Continued)

*Primary Examiner* — David García Cervetti
*Assistant Examiner* — Amie C Lin
(74) *Attorney, Agent, or Firm* — Schwabe, Williamson & Wyatt, P.C.

(57) ABSTRACT

An apparatus, a system and a method for securing sensor data by a security engine circuitry of a system on chip (SoC). For example, the security engine may receive from a processor circuitry of the SoC an inter processor communication (IPC) request to secure sensor data, and may send to an integrated sensor hub (ISH) of the SoC an IPC request to receive sensor data. The ISH may collect sensor data from one or more internal and/or external sensors, and may send the collected sensor data to the security engine. The security engine may receive the collected sensor data from the ISH, may secure the collected sensor data, and may send secured sensor data to the processor circuitry.

20 Claims, 4 Drawing Sheets

(51) Int. Cl.
  *G09C 1/00*        (2006.01)
  *G06F 21/72*       (2013.01)

(56) References Cited

U.S. PATENT DOCUMENTS

| | | | |
|---|---|---|---|
| 2009/0164797 A1* | 6/2009 | Kramer | G06F 21/32 |
| | | | 713/186 |
| 2012/0159172 A1* | 6/2012 | Saxena | G06F 21/57 |
| | | | 713/171 |
| 2013/0138964 A1* | 5/2013 | Joyce, III | H04L 9/3231 |
| | | | 713/176 |
| 2014/0068779 A1 | 3/2014 | Tan et al. | |
| 2014/1050100 | 5/2014 | Gupta et al. | |
| 2014/0205099 A1 | 7/2014 | Christodorescu et al. | |

OTHER PUBLICATIONS

International Preliminary Report on Patentability mailed Mar. 9, 2017, issued in corresponding International Application No. PCT/US2015/037614, 11 pages.

\* cited by examiner

HANDLING SENSOR DATA

TECHNICAL FIELD

Some embodiments described herein generally relate to handling sensor data.

BACKGROUND

Today, handheld devices, such as Smartphones and tablets, rely on sensor data (accelerometer, gyro, magnetometer, pressure, ambient light, temperature, etc.) to enhance the user experience (UX) for a whole range of applications (e.g., phone settings, games) and offer new features (e.g., always-on sensing, motion-based gestures, user activity state, pedometer, etc.) to enable new categories of applications. Besides motion sensors and other ambient sensors, applications on mobile devices also use sensor data from other sensors, such as, audio (e.g., for voice authentication), camera (e.g., for face recognition, augmented reality), always-on location (using GPS, WiFi, 3G/LTE, dead-reckoning), and the like.

The sensor data may include user sensitive, personal and private information, such as user health related information, audio information, camera pictures and video, and/or user location. This user information is not protected and/or secured, while provided to backend services, and may be downloaded and viewed by unwanted entities and/or persons. Thus, there is a need to protect and secure the user information.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

Figure 1:
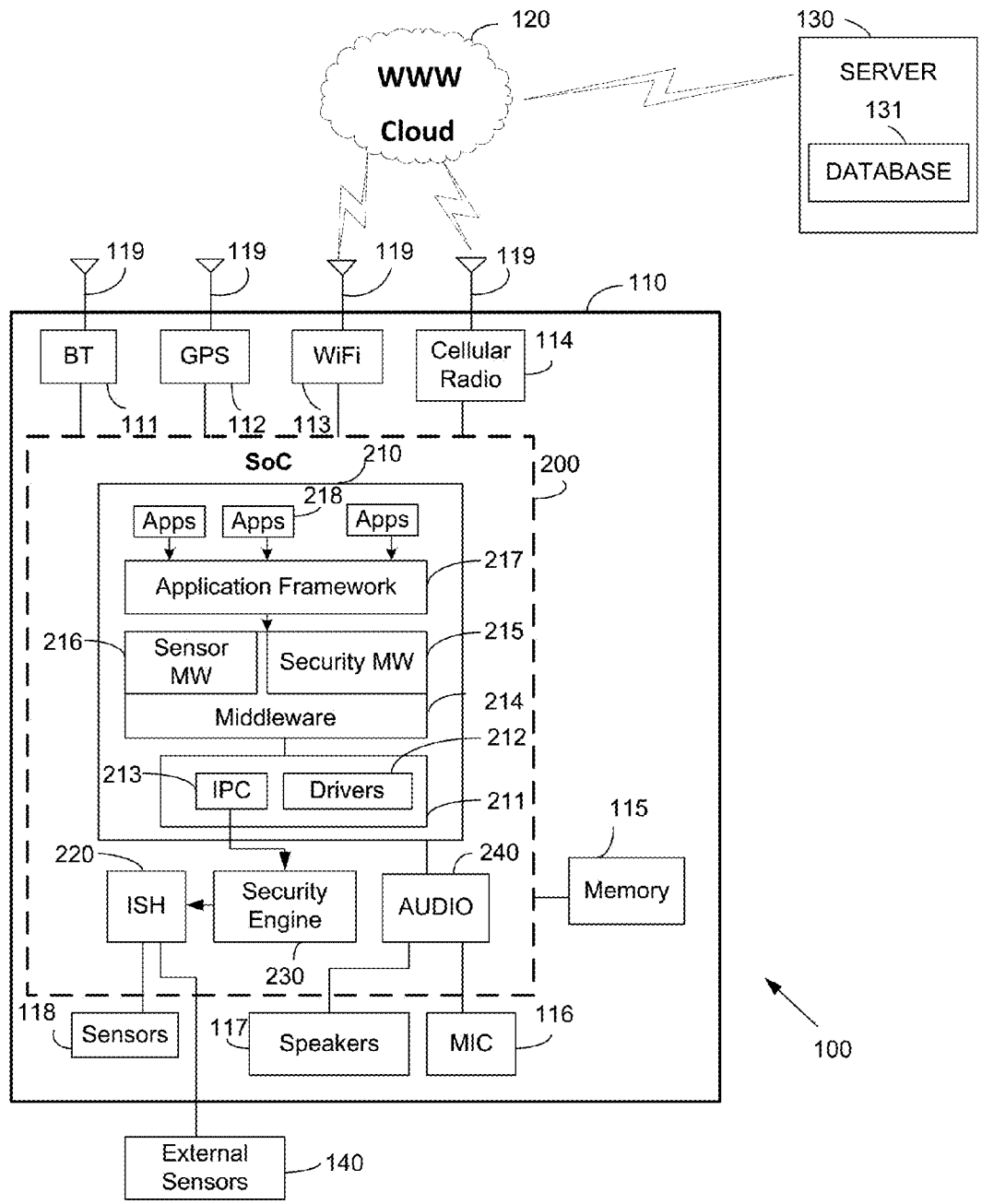
FIG. 1 is a schematic block diagram illustration of a system including a mobile device, a cloud, and a server, in accordance with some demonstrative embodiments.

Reference will now be made to the exemplary embodiments illustrated, and specific language will be used herein to describe the same. It will nevertheless be understood that no limitation of the scope of the disclosure is thereby intended.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a User Equipment (UE), a Mobile Device (MD), an Internet of Things (IoT) device, a desktop computer, a mobile computer, a laptop computer, a notebook computer, a tablet computer, an Ultrabook™ computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a cellular network, a cellular node, a handheld device, e.g., a Smartphone, a Wireless Application Protocol (WAP) device, vending machines, sell terminals, and the like.

The phrases "wireless device" and/or "mobile device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" and/or "mobile device" may optionally include a wireless service.

The term "communicating" as used herein with respect to a wire and/or wireless and/or internal communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit.

Reference is made to FIG. 1, which schematically illustrates a system 100 including a mobile device 110, a World Wide Web (WWW) cloud 120, and a server 130, in accordance with some demonstrative embodiments. One or more external sensors 140 may be operably coupled to mobile device 110, if desired.

According to some exemplary embodiments, system 100 may include a wireless local area network (WLAN), a cellular network, a local area network (LAN), a wide area network (WAN), a wireless WAN, or the like.

According to some non-limiting embodiments, for example, mobile device 110 may include a wireless mobile device such as, for example, a cellphone, a Smartphone, a wearable device, a tablet, a laptop computer, an Internet of things (IoT) device, and the like.

According to a non-limiting exemplary embodiment, mobile device 110 may include a system on chip (SoC) circuitry and/or logic 200, a Bluetooth (BT) circuitry 111, a global positioning system (GPS) receiver 112, a wireless local area network (WLAN) radio 113, e.g., a Wireless-Fidelity (WiFi) radio, a memory 115, a microphone (MIC) 116, one or more speakers 117, one or more sensors 118, and one or more antennas 119, e.g., a plurality of antennas 119.

According to some non-limiting embodiments, SoC circuitry 200 may include a processor circuitry 210, an integrated sensor hub (ISH) 220, a security engine circuitry 230, and/or an audio circuitry 240, if desired.

For example, processor circuitry 210 my include, but not limited to, a kernel layer 211 which may include, for example, one or more drivers 212 and an inter-processor communication (IPC) logic 213; a middleware (MW) layer 214, which may include, for example, a security MW logic 215, and a sensor MW logic 216; an application framework layer 217; and one or more applications 218, e.g., operably coupled to application framework layer 217, if desired.

In some demonstrative embodiments, ISH 220 may include a sensor data acquisition (DAQ) and sensor fusion. HIS 220 may perform sensor processing, e.g., all sensor processing, required for an OS in processor circuitry 210, and may also perform continuous sensing usages, e.g., when a platform of device 110 is in a low power state, e.g., a lowest power state.

In some demonstrative embodiments, sensors 118 may be connected to ISH 220 by a wired or a wireless I/O bus. For example, ISH 220 may include a processor core, which may, for example, operate at a speed of 100 Megahertz (MHz) or any other speed, and ISH 220 may handle more complex workloads in a responsive fashion, if desired.

In another demonstrative embodiment, ISH 220 may include a paging architecture for code-provider flexibility in handling larger code sizes, if desired. For example, ISH 220 may include a direct IPC channel to processor circuitry 210, security engine 230, Audio DSP 240, an image processor (not shown), and the like.

According to some demonstrative embodiments, ISH 220 may collect data and/or communicate with one or more external sensors 140, which, for example, may be connected with a low power radio protocol. According to another example external sensors 140 may be connected to ISH 220 via a wireless link. Thus, exemplary embodiments of ISH 220 may become the communication Hub for collecting data from external sensor pods.

ISH Firmware of ISH 220 may be secure. For example, the ISH firmware may be configured to perform sensor DAQ and processing, may be integrity checked and loaded from a signed firmware image, e.g., from external memory 115.

The above embodiments may apply to other IP blocks that are used to offload for example, audio processing (Audio DSP), camera image processing (Imaging Signal Processor), location (GNSS/GPS, WiFi, 3G/LTE), and the like.

In some demonstrative embodiments, a user of mobile device 110 may use one or more applications 218 operated on mobile device 110, for example, to transfer user data. The user data may be collected by one or more sensors 118 and or one or more external sensors 140, and provided, e.g., through WWW cloud 120 or via any other medium, to server 130, for example, a backend server or any other server. For example, the user data may include medical data such as, for example, blood pressure data, sugar level data, heartbeat data, stress data, and the like. Additionally or alternatively, the user data may include user location data, image data, video data, audio data, private data such as, for example, contacts list data, blog data, password data, bank account information, and/or any other private information, sensitive information, and/or information and/or data to be protected or secured.

According to some exemplary embodiments, application 218 may receive user data, may validate a certificate, and may locally logs the user data. According to another example, the user data may be sent to WWW cloud 120, where the certificate is verified and further heuristics may be performed to match data patterns with historical data from the same user. Thus, preventing false information or outliers in the data getting logged. The user may change the privacy setting of the secure sensing, e.g., ordering ISH 220 not to forward data from some health sensors to the host. Security engine 230 may encrypt data so that only the remote web service can open it, if desired.

According to some demonstrative embodiments, mobile device 110 may include an enhanced privacy identifier (EPID) provisions and software (not shown), and server 130 may include EPID software and an access to a corresponding public key, for example, from an issuer of the EPID keys.

According to some demonstrative embodiments, mobile device 110 may be configured to transfer the user data in a secure manner to server 130 e.g., the backend server. For example, application 218 may create a verified device message and may send the verified device message to security engine 230. Security engine 230 may sign the verified device message by using for example, the EPID protocol, and/or digital signature standard (DSS). The Signed message may be transferred from security engine 230 to a host side application (not shown). The host side application may send the signed message to the server 130.

In some demonstrative embodiments, server side SW (not shown) may use an Issuer's public key to attest that the signature belongs to mobile device 110 in good standing. Once the connection between mobile device 130 and server 130 is established, the EPID Sigma protocol may be used to exchange session keys, for example, session key (SK) encrypt messages, master keys (MK), integrity protects messages, or the like. The SK may be transferred to the security engine 230, if desired.

Acceding to some demonstrative embodiments, the sensor data from sensors 118 and/or 140, for example, user health related data, audio data, camera data, location data, or other Personally Identifiable Information (PII) data, may be transferred to server 130, e.g., in a secure manner. For example, application 218 may request certified sensor data related to user health. ISH 220 may gather the sensor data from sensors 118 and/or 140, and may transfer the sensor data to security engine 230. Security engine 230 may encrypt the sensor data, e.g., with the SK and the MK, for example, to sign the sensor data, and thus, apply an integrity protection to the sensor data.

In some demonstrative embodiments, security engine 230 may pass the encrypted sensor data to application 218, which operates on processor circuitry 210. The encrypted sensor data may be sent on a secure channel to server 130. Server 130, e.g., the backend server, may use a copy of the SK, e.g., to decrypt the encrypted sensor data. Server 130 may verify that the integrity of the sensor data has not been compromised.

In some demonstrative embodiments, server 130 may process the sensor data, e.g., to complete checking the sensor data, to consume the data, and/or to complete any necessary analysis, and may, optionally, securely send an output of processing the sensor data back to application 218 on mobile device 110.

Advantageously, a device, e.g., mobile device 110, equipped with EPID may be recognized by a backend server, e.g., server 130 as a device associated with a certain level of trust/security capabilities. For example, the device may use a Sigma protocol to setup a session oriented secure channel from the device to the backend server. In alternative embodiments, the device may implement a public key infrastructure (PKI), e.g., directly in security engine 230, to generate a key pair and establish a secure channel between mobile device 110 and server 130 for user authentication and transfer of sensor data.

According to some demonstrative embodiments, for example, SoC 200 may be configured to secure sensor data, e.g., from sensors 1§18 and/or 140. Processor circuitry 210 may be configured to collect and update sensor data to a service. ISH 220 may be configured to collect and process the one or more sensors data.

In some demonstrative embodiments, security engine 230 may be configured to receive the sensor data from the ISH 220. Security engine 230 may certify the sensor data, and may send certified sensor data to middleware framework 214. Security engine 230 may be configured to receive from IPC 213 of processor circuitry 210 an IPC request to provide the secure sensor data. Security engine 230 may be configured to send to ISH 220 the IPC request, to add a certificate to the requested sensor data, and to send the certified requested sensor data to processor circuitry 210.

According to some demonstrative embodiments, security engine 230 may be configured to generate at least one encryption key to encrypt the sensor, data and to add a certificate to the sensor data. For example, the certified requested sensor data may be delivered to middleware (MW) framework 214 of the processor circuitry 210.

For example, the certified requested sensor data may be configured to be used by a service in mobile device 110 and/or in cloud 120. The certified requested sensor data may be configured to be certified against user credentials, and to be logged to a database 131 in server 130.

Figure 2:
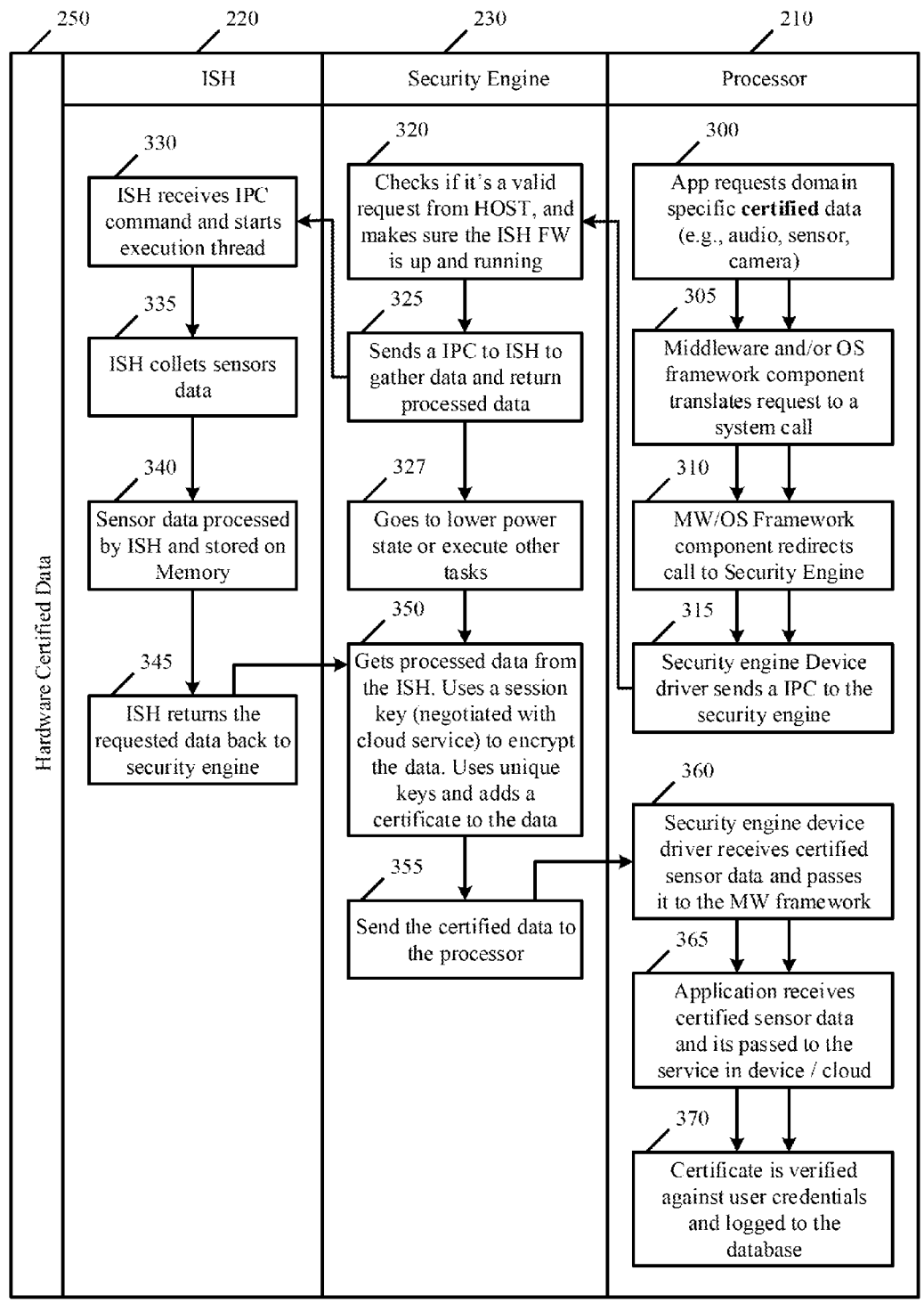
FIG. 2 is a schematic flow-chart illustration of a method of securing a sensor data at system on chip (SoC), in accordance with some demonstrative embodiments.

Reference is made to FIG. 2, which schematically illustrates a method of securing a sensor data at a system on chip (SoC) 200, in accordance with some demonstrative embodiments. For example, a secure and/or hardware certified data 250 (FIG. 2) may flow from processor circuitry 210 to security engine 230, from security engine 230 to ISH 220 and back to security engine 230, and to application 218 (FIG. 1), which may be running on an operating system (OS) of processor circuitry 210. For example, the OS may be an Android™ OS, an Apple® iOS®, a Windows® OS, or the like.

According to some alternative embodiments, ISH 220 may include one or more IP blocks such as, for example, audio, sensor, imaging, and the like. For example, ISH 220 may collect data from one or more sensors, a microphone, a camera and the like, e.g., as described above, although it should be understood that other alternative embodiments with different IP blocks may be used.

As indicated at block 300, according to some demonstrative embodiments, for example, the method of FIG. 2 may be initiated by an application e.g., application 218 (FIG. 1), operated over the operating system (OS) of processor circuitry 210. Application 218 (FIG. 1) may request certified data from, for example, one or more sensors, e.g., sensors 118 and/or 140 (FIG. 1). At processor circuitry 210, middleware (MW) 214 (FIG. 1) and/or an OS framework component may translate the request to a system call (text box 305). MW 214 (FIG. 1) and/or the OS framework component may redirect the system call to a security engine device driver (text box 310). The security engine device driver may send an IPC 213 (FIG. 1) to security engine 230 (text box 315).

As indicated tat block 320, security engine 230 may check the validity of the request and that the ISH FW is in operation. Security engine 230 may send IPC 213 (FIG. 1) to ISH 220, e.g., to request ISH 220 to gather sensor data and return processed data (text box 325). While ISH 220 gathers the sensor data, security engine 230 may go to a lower power state mode and/or may execute other tasks (text box 327).

According to some exemplary embodiments, ISH 220 may receive IPC 213 (FIG. 1) and may start an execution thread (text box 330). ISH 220 may collect sensor data (text box 335), may process the sensor data, and may store the processed sensors data in a memory e.g., memory 115 (FIG. 1), if desired (text box 340). ISH 220 may send the processed data to security engine (text box 345).

According to some exemplary embodiments, security engine 22 may receive the processed data from ISH 220, may use a session key to encrypt the processed data and may use one or more unique keys to add a certificate to the processed data (text box 350). For example, security engine 230 may negotiate the session key with WWW cloud 120 (FIG. 1), if desired. Security engine 230 may send the processed certified data to processor circuitry 210 (text box 355).

As indicated at block 360, a security engine device driver (not shown) of processor circuitry 210 may receive the certified sensor data and may pass it to sensor MW 216 (FIG. 1). Application 218 (FIG. 1) may receive the certified sensor data, and may pass certified sensor data 250 to a service in WWW cloud 120 (FIG. 1) (text box 365). The certified sensor data may be decrypted. The certificate may be verified against user credentials, and logged to a database e.g. database 131 (FIG. 1) at server 130 (FIG. 1), if desired (text box 370).

Figure 3:
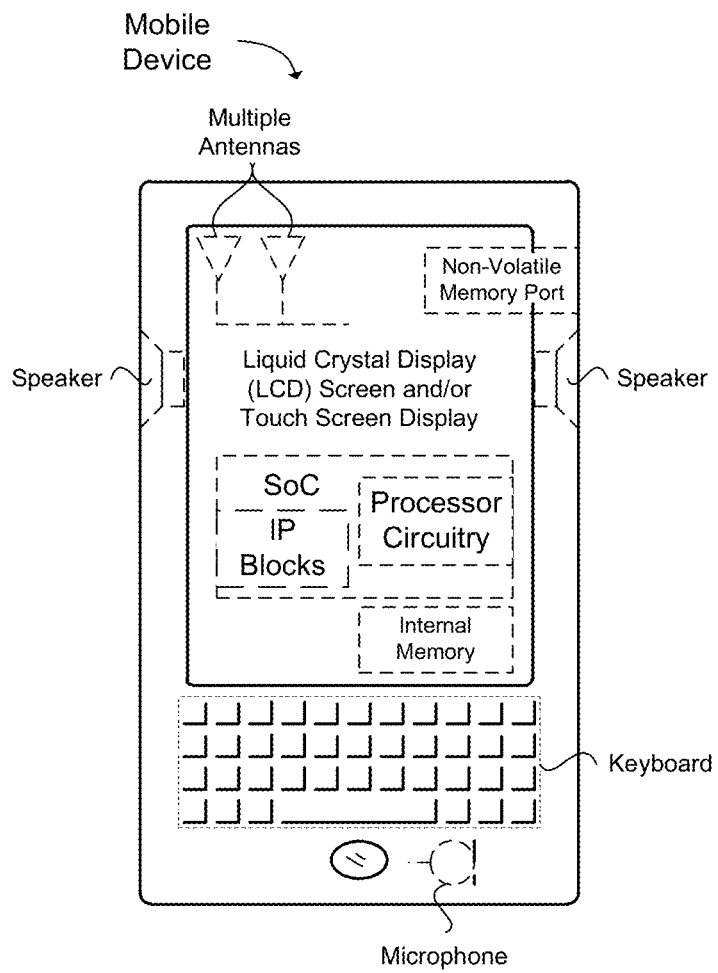
FIG. 3 is a schematic block diagram illustration of a mobile device, in accordance with some demonstrative embodiments.

Reference is made to FIG. 3, which schematically illustrates a mobile device, in accordance with some demonstrative embodiments. The mobile device may include, for example, a user equipment (UE), a mobile station (MS), a mobile wireless device, a cell phone, a Smartphone, a mobile communication device, a tablet, a handset, or other type of mobile wireless device. The mobile device may include one or more antennas configured to communicate with a transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device may be configured to communicate using at least one wireless communication standard including 3GPP LTE, 3GPP UMTS, GSM, WiMAX, High Speed Packet Access (HSPA), Bluetooth, and WiFi. The mobile device may communicate using separate antennas for each wireless communication standard or shared antennas for multiple wireless communication standards. The mobile device may communicate in a WLAN, a wireless personal area network (WPAN), and/or a WWAN.

FIG. 3 also provides an illustration of a microphone and one or more speakers that may be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. A SoC 200 (FIG. 1), which may include processor circuitry 210 (FIG. 1) and one or more IP blocks, may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as, for example CD-ROMs, hard drives, Solid-State Drives (SSD), non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor circuitry, a storage medium readable by the processor circuitry (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Figure 4:
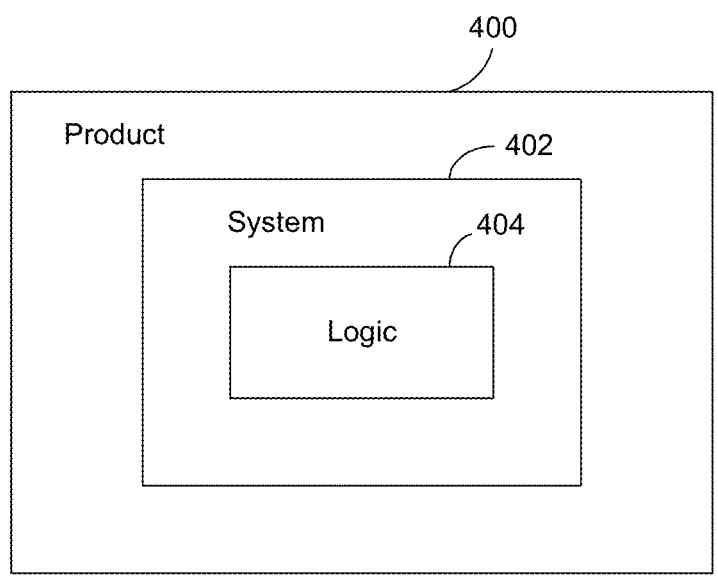
FIG. 4 is a schematic illustration of a product of manufacture, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of one or more elements of system 100 (FIG. 1), one or more elements of SoC 200 (FIG. 1) and/or to perform one or more operations of the method of FIG. 2. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

EXAMPLES

The following examples pertain to further embodiments.

Example 1 includes a method for securing sensor data by a security engine circuitry of a system on chip (SoC), the method comprising receiving from a processor circuitry of the SoC an inter processor communication (IPC) request to receive the sensor data; sending to an integrated sensor hub (ISH) of the SoC an IPC request for receiving the sensor data; receiving the sensor data from the ISH; generating certified encrypted sensor data based on the sensor data; and sending the certified encrypted sensor data to the processor circuitry.

Example 2 includes the subject matter of Example 1, and optionally, wherein generating the certified encrypted sensor data comprises adding a certificate to the sensor data to provide certified sensor data; and encrypting the certified sensor data with one or more keys.

Example 3 includes the subject matter of Example 1 or 2, and optionally, comprising delivering the certified encrypted sensor data to a middleware (MW) framework of the processor circuitry.

Example 4 includes the subject matter of any one of Examples 1-3, and optionally, wherein the certified encrypted sensor data is configured to be used by a service in a device including the SoC.

Example 5 includes the subject matter of any one of Examples 1-4, and optionally, wherein the certified encrypted sensor data is configured to be used by a service in a cloud.

Example 6 includes the subject matter of any one of Examples 1-5, and optionally, wherein the certified encrypted sensor data is configured to be certified against user credentials and logged to a database.

Example 7 includes a system on chip (SoC) configured to secure sensor data, the SoC comprising processor circuitry; an integrated sensor hub (ISH) configured to collect and process the sensor data; and a security engine configured to receive the sensor data from the ISH, certify and encrypt the sensor data, and send certified encrypted sensor data to a middleware framework of the processor circuitry, the processor circuitry being configured to provide the certified encrypted sensor data to a service.

Example 8 includes the subject matter of Example 7, and optionally, wherein the security engine is configured to receive from the processor circuitry an inter processor communication (IPC) request to provide the secure sensor data.

Example 9 includes the subject matter of Example 7 or 8, and optionally, wherein the security engine is configured to send to the ISH an IPC request to receive the sensor data, to add a certificate to the sensor data, and to send the certified sensor data to the processor circuitry.

Example 10 includes the subject matter of any one of Examples 7-9, and optionally, wherein the security engine is configured to generate at least one encryption key to encrypt the sensor data and to add a certificate to the sensor data.

Example 11 includes the subject matter of any one of Examples 7-10, and optionally, wherein the certified encrypted sensor data is configured to be used by a service in a device including the SoC.

Example 12 includes the subject matter of any one of Examples 7-11, and optionally, wherein the certified encrypted sensor data is configured to be used by a service in a cloud.

Example 13 includes the subject matter of any one of Examples 7-12, and optionally, wherein the certified encrypted sensor data is configured to be certified against user credentials and to be logged to a database.

Example 14 includes a computer program product comprising a non-transitory computer readable storage medium having a computer readable program code embodied therein, the computer readable program code adapted to be executed by a mobile device to implement a method for securing sensor data by security engine circuitry of a system on chip (SoC), the method comprising receiving from a processor circuitry of the SoC an inter processor communication (IPC) request to receive the sensor data; sending to an integrated sensor hub (ISH) of the SoC an IPC request for receiving the sensor data; receiving the sensor data from the ISH; generating certified encrypted sensor data based on the sensor data; and sending the certified encrypted sensor data to the processor circuitry.

Example 15 includes the subject matter of Example 14, and optionally, wherein sending the certified requested sensor data comprises adding a certificate to the sensor data to provide certified sensor data; and encrypting the certified sensor data with one or more keys.

Example 16 includes the subject matter of Example 14 or 15, and optionally, wherein the method comprises delivering the certified encrypted sensor data to a middleware (MW) framework of the processor circuitry.

Example 17 includes the subject matter of any one of Examples 14-16, and optionally, wherein the certified encrypted sensor data is configured to be used by a service in a device including the SoC.

Example 18 includes the subject matter of any one of Examples 14-17, and optionally, wherein the certified encrypted sensor data is configured to be used by a service in a cloud.

Example 19 includes the subject matter of any one of Examples 14-18, and optionally, wherein the certified encrypted sensor data is configured to be certified against a user credentials and logged to a database.

Example 20 includes a mobile device configured to secure sensor data, the mobile device comprising a wireless local area radio operably coupled to a system on chip (SoC), wherein the SoC comprises processor circuitry; an integrated sensor hub (ISH) configured to collect and process the sensor data; and a security engine configured to receive the sensor data from the ISH, certify and encrypt the sensor data, and send certified encrypted sensor data to a middleware framework of the processor circuitry, the processor circuitry being configured to provide the certified encrypted sensor data to a service.

Example 21 includes the subject matter of Example 20, and optionally, wherein the security engine is configured to receive from the processor circuitry an inter processor communication (IPC) request to provide the secure sensor data.

Example 22 includes the subject matter of Example 20 or 21, and optionally, wherein the security engine is configured to send to the ISH an IPC request to receive the sensor data, to add a certificate to the sensor data, and to send the certified sensor data to the processor circuitry.

Example 23 includes the subject matter of any one of Examples 20-22, and optionally, wherein the security engine is configured to generate at least one encryption key to encrypt the sensor data, and to add a certificate to the sensor data.

Example 24 includes the subject matter of any one of Examples 20-23, and optionally, wherein the certified encrypted sensor data is configured to be used by a service in a cloud.

Example 25 includes the subject matter of any one of Examples 20-24, and optionally, wherein the certified encrypted sensor data is configured to be certified against user credentials and to be logged to a database.

Example 26 includes a mobile device configured to secure sensor data, the mobile device comprising a system on chip (SoC) operably coupled to one or more sensors, wherein the SoC comprises processor circuitry; an integrated sensor hub (ISH) configured to collect and process the sensor data; and a security engine configured to receive the sensor data from the ISH, certify and encrypt the sensor data, and send certified encrypted sensor data to a middleware framework of the processor circuitry, the processor circuitry being configured to provide the certified encrypted sensor data to a service.

Example 27 includes the subject matter of Example 26, and optionally, wherein the security engine is configured to receive from the processor circuitry an inter processor communication (IPC) request to provide the secure sensor data.

Example 28 includes the subject matter of Example 26 or 27, and optionally, wherein the security engine is configured to send to the ISH an IPC request to receive the sensor data, to add a certificate to the sensor data, and to send the certified sensor data to the processor circuitry.

Example 29 includes the subject matter of any one of Examples 26-28, and optionally, wherein the security engine is configured to generate at least one encryption key to encrypt the sensor data, and to add a certificate to the sensor data.

Example 30 includes the subject matter of any one of Examples 26-29, and optionally, wherein the certified encrypted sensor data is configured to be used by a service in a cloud.

Example 31 includes the subject matter of any one of Examples 26-30, and optionally, wherein the certified encrypted sensor data is configured to be certified against user credentials and to be logged to a database.

Example 32 includes the subject matter of any one of Examples 26-31, and optionally, wherein the one or more sensors are external to the mobile device.

Example 33 includes a system on chip (SoC) configured to secure sensor data, the SoC comprising means to perform the method of any one of Examples 1-6.

Example 34 includes a computer program product comprising a non-transitory computer readable storage medium having a computer readable program code embodied therein, the computer readable program code adapted to be executed by a mobile device to implement the method of any one of Examples 1-6.

Example 35 includes a mobile device configured to secure sensor data comprising a wireless local area radio operably coupled to a system on chip (SoC), wherein the SoC comprises means to perform the method of any one of Examples 1-6.

Example 36 includes a system on chip (SoC) configured to secure sensor data, the SoC comprising processor circuitry; an integrated sensor hub (ISH) means configured to collect and process the sensor data; and a security engine means configured to receive the sensor data from the ISH, certify and encrypt the sensor data, and send certified encrypted sensor data to a middleware framework of the processor circuitry, the processor circuitry being configured to provide the certified encrypted sensor data to a service.

Example 37 includes the subject matter of Example 36, and optionally, wherein the security engine means is configured to receive from the processor circuitry SoC an inter processor communication (IPC) request to provide the secure sensor data.

Example 38 includes the subject matter of Example 36 or 37, and optionally, wherein the security engine means is configured to send to the ISH means an IPC request to receive the sensor data, to add a certificate to the sensor data, and to send the certified sensor data to the processor circuitry.

Example 39 includes the subject matter of any one of Examples 36-38, and optionally, wherein the security engine means is configured to generate at least one encryption key to encrypt the sensor data, and to add a certificate to the sensor data.

Example 40 includes the subject matter of any one of Examples 36-39, and optionally, wherein the certified encrypted sensor data is to be delivered to a middleware (MW) framework of the processor circuitry.

Example 41 includes the subject matter of any one of Examples 36-40, and optionally, wherein the certified encrypted sensor data is configured to be used by a service in a device including the SoC.

Example 42 includes the subject matter of any one of Examples 36-41, and optionally, wherein the certified encrypted sensor data is configured to be used by a service in a cloud.

Example 43 includes the subject matter of any one of Examples 36-42, and optionally, wherein the certified encrypted sensor data is configured to be certified against user credentials and to be logged to a database.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example ay be referred to herein along with alternatives for the various components thereof. It is understood that such embodiments, examples, and alternatives are not to be construed as defacto equivalents of one another, but are to be considered as separate and autonomous representations.

Furthermore, the described features, structures, or characteristics may be combined in any suitable manner in one or more embodiments.

In the foregoing description, numerous specific details are provided, such as examples of layouts, distances, network examples, etc., to provide a thorough understanding of some demonstrative embodiments. One skilled in the relevant art will recognize, however, that some embodiments can be practiced without one or more of the specific details, or with other methods, components, layouts, etc. In other instances, well-known structures, materials, or operations are not shown or described in detail to avoid obscuring aspects of the disclosure.

While the forgoing examples are illustrative of the principles of some embodiments in one or more particular applications, it will be apparent to those of ordinary skill in the art that numerous modifications in form, usage and details of implementation can be made without the exercise of inventive faculty, and without departing from the principles and concepts of the disclosure. Accordingly, it is not intended that the disclosure be limited, except as by the claims set forth below.

What is claimed is:

1. A method for securing sensor data by a security engine circuitry of a system on chip (SoC), the method comprising:
   receiving from a processor circuitry of the SoC an inter processor communication (IPC) request to receive the sensor data;
   determining that an integrated sensor hub (ISH) of the SoC is in operation, in response to receiving the IPC request;
   sending the IPC request to the ISH of the SoC, to cause the ISH to gather the sensor data, in response to the determination that the ISH of the SoC is in operation;
   entering a lower power state mode or executing other tasks for a period of time during which the ISH is gathering the sensor data;
   receiving the sensor data from the ISH and quitting the lower power state or execution of other tasks in response to receiving the sensor data;
   generating certified encrypted sensor data based on the sensor data; and
   sending the certified encrypted sensor data to a middleware framework of the processor circuitry, wherein the processor circuitry is to provide the certified encrypted sensor data to a service.

2. The method of claim 1, wherein generating the certified encrypted sensor data comprises:
   adding a certificate to the sensor data to provide certified sensor data; and
   encrypting the certified sensor data with one or more keys.

3. The method of claim 1, wherein the certified encrypted sensor data is to be used by a service in a device including said SoC.

4. The method of claim 1, wherein the certified encrypted sensor data is to be used by a service in a cloud.

5. The method of claim 1, wherein the certified encrypted sensor data is to be certified against user credentials and logged to a database.

6. A system on chip (SoC) to secure sensor data, the SoC comprising:
   processor circuitry;
   an integrated sensor hub (ISH) to collect and process the sensor data; and
   a security engine to:
   receive from the processor circuitry an inter processor communication (IPC) request to provide the secure sensor data;
   determine that the ISH is in operation, in response to the receipt of the IPC request;
   send the IPC request to the ISH to cause the ISH to gather the sensor data, in response to the determination that the ISH of the SoC is in operation;
   enter a lower power state mode or execute other tasks for a period of time during which the ISH gathers the sensor data;
   receive the sensor data from the ISH and quit the lower power state or execution of other tasks in response to the receipt of the sensor data;
   certify and encrypt the sensor data; and
   send certified encrypted sensor data to a middleware framework of the processor circuitry, wherein the processor circuitry is to provide the certified encrypted sensor data to a service.

7. The SoC of claim 6, wherein the security engine to certify the sensor data includes to add a certificate to the sensor data.

8. The SoC of claim 6, wherein the security engine to encrypt the sensor data includes to generate at least one encryption key to encrypt the sensor data.

9. The SoC of claim 6, wherein the certified encrypted sensor data is to be used by a service in a device including the SoC.

10. The SoC of claim 6, wherein the certified encrypted sensor data is to be used by a service in a cloud.

11. The SoC of claim 6, wherein the certified encrypted sensor data is to be certified against user credentials and to be logged to a database.

12. A non-transitory computer readable storage medium having a computer readable program code to implement operations for securing sensor data by security engine circuitry of a system on chip (SoC) embodied therein, to be executed by a mobile device to:
   receive from a processor circuitry of the SoC an inter processor communication (IPC) request to receive the sensor data;
   determine that an integrated sensor hub (ISH) of the SoC is in operation, in response to the receipt of the IPC request;
   send the IPC request to the ISH to cause the ISH to gather the sensor data, in response to the determination that the ISH of the SoC is in operation;
   enter a lower power state mode or execute other tasks for a period of time during which the ISH gathers the sensor data;
   receive the sensor data from the ISH and quit the lower power state or execution of other tasks in response to the receipt of the sensor data;
   generate certified encrypted sensor data based on the sensor data; and
   send the certified encrypted sensor data to a middleware framework of the processor circuitry, wherein the processor circuitry is to provide the certified encrypted sensor data to a service.

13. The non-transitory computer readable storage medium of claim 12, wherein the code to send the certified encrypted sensor data comprises to:
   add a certificate to the sensor data to provide certified sensor data; and
   encrypt the certified sensor data with one or more keys.

14. The non-transitory computer readable storage medium of claim 12, wherein the certified encrypted sensor data is to be used by a service in a device including said SoC.

15. The non-transitory computer readable storage medium of claim 12, wherein the certified encrypted sensor data is to be used by a service in a cloud.

16. The non-transitory computer readable storage medium of claim 12, wherein the certified encrypted sensor data is to be certified against user credentials and logged to a database.

17. A mobile device to secure sensor data, the mobile device comprising:
   a wireless local area radio operably coupled to a system on chip (SoC), wherein the SoC comprises:
   processor circuitry;
   an integrated sensor hub (ISH) to collect and process the sensor data; and a security engine to receive from the processor circuitry an inter processor communication (IPC) request to provide the secure sensor data; determine that the ISH is in operation, in response to the receipt of the IPC request; send the IPC request to the ISH to cause the ISH to gather the sensor data, in response to the determination that the ISH of the SoC is in operation; enter a lower power state mode or execute other tasks for a period of time during which the ISH gathers the sensor data; receive the sensor data from the ISH and quit the lower power state or execution of other tasks in response to the receipt of the sensor data; certify and encrypt the sensor data, and send certified encrypted sensor data to a middleware framework of the processor circuitry, wherein the processor circuitry is to provide the certified encrypted sensor data to a service.

18. The mobile device of claim 17, wherein the certified encrypted sensor data is to be certified against user credentials and to be logged to a database.

19. The mobile device of claim 17, wherein the security engine is to add a certificate to the sensor data.

20. The mobile device of claim 17, wherein the security engine is to generate at least one encryption key to encrypt the sensor data.

* * * * *